March 23, 1965     W. I. WORKMAN     3,174,761

FLUID SEAL AND COOPERATING GROOVE

Filed Nov. 26, 1962

3,174,761
FLUID SEAL AND COOPERATING GROOVE
Woodrow I. Workman, Hill, N.H., assignor to International Packings Corporation, Bristol, N.H., a corporation of Massachusetts
Filed Nov. 26, 1962, Ser. No. 239,894
6 Claims. (Cl. 277—174)

This invention relates to sealing means for pressurized fluids and more particularly to a V-shaped seal which is an improvement in arch seals of the type heretofore patented by me in Patent No. 3,052,476, dated September 4, 1962.

In that patent was shown and described the manner of constructing an annular arch seal and arranging it with cooperating groove means in order that it be adapted for transverse sliding movement within said groove means. Moreover, in that patent it was taught to be desirable to space such a seal above the bottom surface of the groove means and to have the upper surface in contact with an opposing bearing surface to obtain a highly efficient sealing action against pressurized fluids when there is a substantial pressure differential on sides of the seal. A problem arises, however, when the differential pressure of the fluid on sides of the arch seal is zero or very nearly zero. In such a situation, the friction between the upper surface of the arch seal and the bearing surface which it contacts may frequently give rise to a situation where the arch seal is positioned at the center of the groove means thereby permitting fluid to be transmitted from one side of the arch seal to the other side thereof.

In an attempt to remedy this generally unsatisfactory condition, I have previously designed an arch seal and O ring combination which is the subject matter of my application, Serial No. 205,389, filed June 26, 1962, and now abandoned, which application is a continuation-in-part of my patent hereinbefore referred to. The present application is a continuation-in-part of said application which is in turn a continuation-in-part of said patent.

Unfortunately, in the arch seal and O ring construction, a separate element, an O ring, is required to prevent the transmission of fluid about the arch seal, the O ring being positioned between the arch and the bottom of the cooperating groove means. Hence, although the combination of an O ring with the arch seal is functionally sound, it nonetheless adds to the cost of manufacture in that it requires an entirely separate element and in that the O ring must be assembled with the arch seal, thus requiring a separate assembly operation.

It is therefore a prime object of this invention to provide an arch seal of the type hereinbefore described wherein the transmission of fluids about the arch seal is prevented by the arch seal itself when differential pressure on the side of the seal is nearly zero.

In general my invention comprises an arch seal which is positioned in cooperating groove means of one bearing means and which has an upper surface contacting the bearing surface of a second bearing means which extends across the groove means. The arch seal is of such a dimension that its bottom surface adjacent to the bottom of the groove means is spaced thereabove and such that it is permitted to move transversely in said groove means. The bottom of the arch seal has an arched recessed configuration providing thin relatively flexible lips at the sides thereof. The relative dimensions of the groove means and of the arch seal are such that adjacent to the bottom surface of the arch seal there is contact between the arch seal and the groove means, but with the major portions of the side walls of said seal being spaced from the sidewalls of the groove. This may be accomplished in either of two ways; either by providing a groove which tapers inwardly toward the bottom surface thereof or a seal which tapers outwardly at the bottom surface thereof. It will be readily seen that in this manner, the function of the arch seal is retained while at the same time the transmission of fluids is prevented when the differential pressure at the sides of the arch seal approaches zero.

Other features, objects and advantages of this invention will be readily apparent to those skilled in the art from the following detailed description thereof, together with the accompanying drawing wherein.

Figure 1:
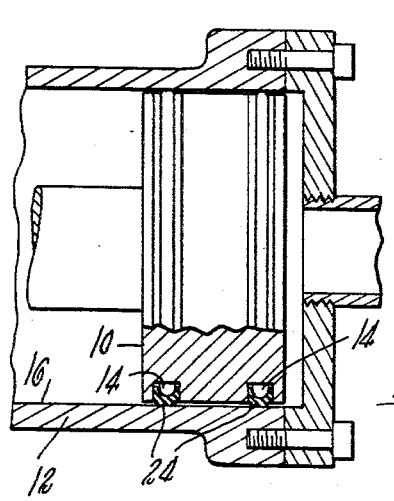
FIG. 1 is a sectional view in side elevation of a piston and cylinder employing one preferred embodiment of the invention.
Figure 2:
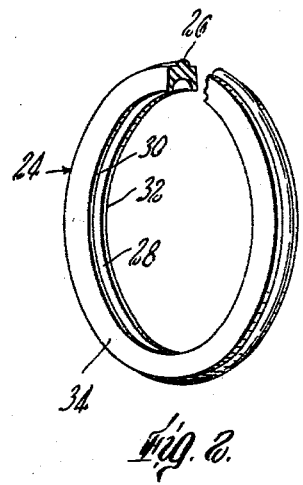
FIG. 2 is an isometric view of the seal shown in FIG. 1.
Figure 3:
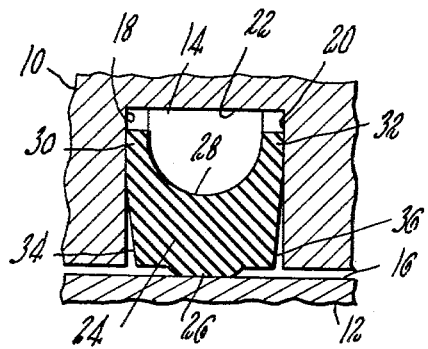
FIG. 3 is an enlarged fragmentary view of the preferred embodiment of the seal and groove means shown in FIG. 1.
Figure 4:
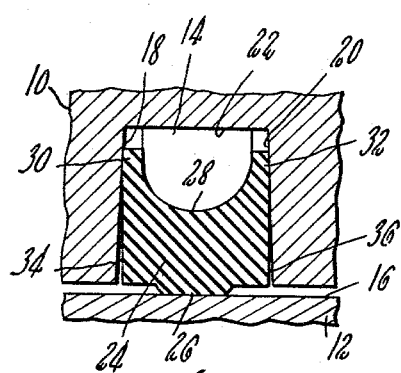
FIG. 4 is an enlarged view of a second preferred embodiment of the invention.
Figure 5:
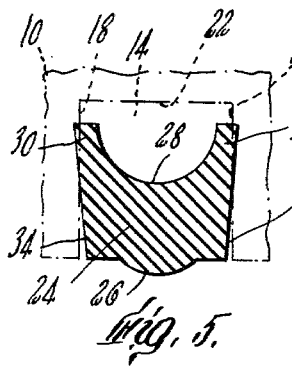
FIG. 5 is a view of the seal of FIG. 3 showing in broken lines its relation to the groove means.

Referring to the drawings and more particularly to FIGS. 3 and 4 thereof, a pair of bearing means 10, 12 are provided, one of which has groove means 14 provided therein and the other of which has a bearing surface 16 extending across said groove means. The groove means 14 has a pair of side wall surfaces 18, 20 and a bottom surface 22. Positioned within the groove means 14 is an arch seal 24, as in FIGS. 1–7, of an elastomeric substance such as rubber or the like.

The arch seal 24 comprises an endless annular ring having an upper surface 26 which preferably has a raised rounded surface free of sharp edges which is narrow relative to the bottom surface 28 of the seal. The upper surface 26 of the seal is in contact with the bearing surface 16 which extends across the groove means 14. Preferably, the arch seal has a diameter such that it constantly exerts pressure independently of any fluid pressure on said bearing surface extending across said groove means. The arch seal also has a bottom surface 28 adjacent the bottom surface 22 of the groove means and spaced therefrom. The bottom surface 28 of the seal has a generally arched recessed configuration providing thin relatively flexible lips 30, 32 at either side thereof. Side wall surfaces 34, 36 are also provided on said arch seal adjacent the side wall surfaces 18, 20 of said groove means.

The major portions of the arch seal side wall surfaces 34, 36 are spaced from the corresponding side wall surfaces 18, 20 of the groove means, the seal being generally narrower than the groove means. However, adjacent the bottom surface 28 of the arch seal preferably only at the thin relatively flexible lips 30, 32, thereof, there is contact between the side wall surfaces of the seal and of the groove means. This may be accomplished as in FIGS. 3 and 5 by providing side wall surfaces on said seal which are spaced progressively wider as they approach the bottom surface of said seal. Alternatively, the groove means may be designed to become progressively narrower at the bottom surface thereof as in FIGS. 4 and 7 the side wall surfaces thereof tapering inwardly at the bottom surface thereof. Thus either the side wall surfaces 34, 36 of the seal may comprise fragmentary portions of straight lines intersecting at a point beyond the upper surface 26 thereof as in FIGS. 3 and 5 or the sidewall surfaces 18, 20 of the groove means may comprise fragmentary portions of straight lines intersecting at a point beyond the bottom surface 22 thereof. In either case the seal contacts the side wall surfaces 18, 20 of the groove means, the seal being preferably wider than the groove means, near the bottom surface 22 thereof. If desired, the above structures may be combined with both elements being tapered.

Figure 6:
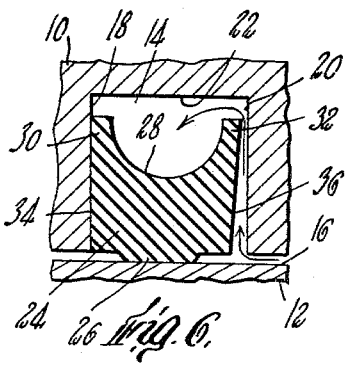
FIG. 6 is a sectional view similar to that of FIG. 3 showing the mode of operation of the seal under pressure.
Figure 7:
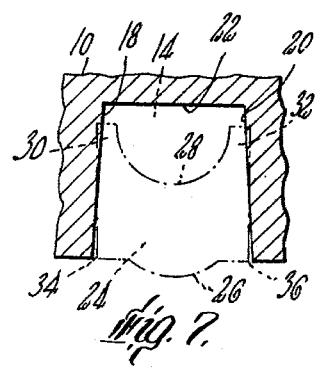
FIG. 7 is a sectional view of the groove means of FIG. 4 showing in broken lines its relation to the seal.

In operation, when the fluid pressure becomes greater on one side 36 of the seal than on the other, the seal is moved transversely, as shown in FIG. 6, by said pressure to form a seal against one of the side wall surfaces 18 of the groove means, the pressure, at the same time, expanding the seal outwardly transmitting pressure through the arch 28 to the raised rounded surface 26 thereof. When pressure decreases or when it is in any even nearly zero, the contact of the side wall surfaces 34, 36 of the seal with the side wall surfaces 18, 20 of the groove means prevents the transmission of fluid about the seal.

It will be readily seen that the improvement in arch seals which the present invention sets forth, greatly enhances the practical utility of arch seals. In a very simple manner, the present invention, while retaining all of the desired characteristics of the arch seal, adds the new function of preventing the transmission of fluids thereabout when differential fluid pressure at the sides thereof is nearly zero. Moreover, the added function of the seal is provided without materially increasing the cost of the seal and without the necessity of extra steps in the assembly thereof.

It will be understood by those skilled in the art that modifications of the present invention are possible without departing from the true spirit and scope thereof and therefore that nothing herein is intended to limit scope of the claims appended hereto.

What I claim is:

1. Sealing means for a pressurized fluid comprising:
   a pair of bearing means;
   groove means having a pair of side wall surfaces and a bottom surface in one of said bearing means;
   said other bearing means having a bearing surface extending across said groove means;
   an endless annular sealing ring of a flexible elastomeric substance in said groove means;
   said ring having upper, bottom and side wall surfaces;
   said upper surface of said ring contacting therearound said bearing surface and said bottom surface of said ring being spaced above said bottom surface of said groove means and having a generally arched recessed configuration to provide thin relatively flexible lip portions adjacent said side wall surfaces of said groove means; and
   said ring being narorwer than said groove means except at the portion of said side wall surfaces of said ring adjacent the bottom surface of said ring at which point said side wall surfaces of said ring and said groove means contact each other for preventing transmission of fluid about said ring at low differential pressure on said side wall surfaces of said ring.

2. The sealing means claimed in claim 1 wherein said upper surface of said ring has a raised, rounded surface free of sharp edges, narrow relative to said bottom surface thereof, and which is contacting said bearing surface.

3. The sealing means claimed in claim 2 wherein said side wall surfaces of said groove means are parallel and wherein the distance between said side wall surfaces of said ring is progressively greater adjacent the bottom surface thereof than at the upper surface thereof.

4. The sealing means claimed in claim 3 wherein said side wall surfaces of said ring comprise fragments of straight lines intersecting at a point beyond said upper surface thereof.

5. The sealing means claimed in claim 2 wherein said side wall surfaces of said ring are parallel and wherein the distance between said side wall surfaces of said groove means is progressively greater away from the bottom surface thereof toward the portion thereof adjacent said upper surface of said ring.

6. The sealing means claimed in claim 5 wherein said side wall surfaces of said groove means comprise fragments of straight lines intersecting at a point beyond the bottom surface thereof.

References Cited in the file of this patent
UNITED STATES PATENTS

| | | |
|---|---|---|
| 2,547,185 | Von Belhar | Apr. 3, 1951 |
| 3,052,476 | Workman | Sept. 4, 1962 |